US012363801B2

(12) United States Patent
Imaoka et al.

(10) Patent No.: US 12,363,801 B2
(45) Date of Patent: Jul. 15, 2025

(54) HEAT TREATMENT DEVICE

(71) Applicant: SHIBAURA MECHATRONICS CORPORATION, Kanagawa (JP)

(72) Inventors: Yuichi Imaoka, Kanagawa (JP); Yosuke Mochizuki, Kanagawa (JP); Kyota Kuroiwa, Kanagawa (JP); Akinori Iso, Kanagawa (JP)

(73) Assignee: Shibaura Mechatronics Corporation, Kanagawa (JP)

( * ) Notice: Subject to any disclaimer, the term of this patent is extended or adjusted under 35 U.S.C. 154(b) by 805 days.

(21) Appl. No.: 17/582,298

(22) Filed: Jan. 24, 2022

(65) Prior Publication Data

US 2022/0248502 A1 Aug. 4, 2022

(30) Foreign Application Priority Data

Feb. 3, 2021 (JP) ................................ 2021-015527
Sep. 22, 2021 (JP) ................................ 2021-154575

(51) Int. Cl.
*H05B 3/22* (2006.01)

(52) U.S. Cl.
CPC .................................... *H05B 3/22* (2013.01)

(58) Field of Classification Search
CPC ........ H05B 1/0227; H05B 3/22; C23C 14/56; F27B 17/00; F27B 5/04; F27B 5/14; F27D 7/06
USPC ...................................................... 219/443.1
See application file for complete search history.

(56) References Cited

U.S. PATENT DOCUMENTS

2003/0124764 A1* 7/2003 Yamazaki ............ C23C 14/564
118/724
2015/0247671 A1* 9/2015 Steinlage ................. F27B 5/04
219/653
2020/0310183 A1* 10/2020 Nishibe .................. F27B 17/00

FOREIGN PATENT DOCUMENTS

| | | | |
|---|---|---|---|
| CN | 101093087 | A | 12/2007 |
| CN | 107871828 | A | 4/2018 |
| JP | 2018-169050 | A | 11/2018 |
| KR | 10-2000-0052580 | A | 8/2000 |
| KR | 10-2005-0021344 | A | 3/2005 |
| TW | 201241886 | A | 10/2012 |
| TW | I696500 | B | 6/2020 |

* cited by examiner

*Primary Examiner* — Sang Y Paik
(74) *Attorney, Agent, or Firm* — Venjuris, P.C.

(57) ABSTRACT

According to an embodiment of the present disclosure, a heat treatment device includes: a chamber capable of maintaining an atmosphere that is decompressed from an atmospheric pressure; an exhaust unit capable of exhausting an inside of the chamber through an exhaust port provided in the chamber; a support portion provided inside the chamber and capable of supporting a workpiece; a first heating unit provided inside the chamber and capable of heating the workpiece; an adhesion preventive plate detachably provided on an inner wall of the chamber; and a second heating unit capable of heating the adhesion preventive plate.

10 Claims, 2 Drawing Sheets

HEAT TREATMENT DEVICE

CROSS-REFERENCE TO RELATED APPLICATIONS

This application is based on and claims priority from Japanese Patent Application Nos. 2021-015527 and 2021-154575, filed on Feb. 3, 2021 and Sep. 22, 2021, respectively, with the Japanese Patent Office, the disclosures of which are incorporated herein in their entireties by reference.

TECHNICAL FIELD

The present disclosure relates to a heat treatment device.

BACKGROUND

A heat treatment device includes a chamber capable of maintaining an atmosphere decompressed from the atmospheric pressure and a heater for heating a workpiece provided inside the chamber. By heating the workpiece, such a heat treatment device forms a film on the surface of the workpiece or processes the surface of the workpiece.

When the workpiece is heated, the substance contained in the surface of the workpiece may be vaporized. The vaporized substance may solidify and adhere to the inner wall of the chamber that has a lower temperature than the heated workpiece. When the solid adhering to the inner wall of the chamber is peeled off, the peeled off solid may become particles and adhere to the surface of the workpiece.

Therefore, a maintenance is required to remove the solid adhering to the inner wall of the chamber on a regular basis or as needed. During the maintenance, the workpiece may not be heat-treated. Therefore, when the maintenance time becomes extended or the number of maintenances increases, the productivity is greatly reduced.

Therefore, a technique has been proposed in which the inner wall of the chamber is heated from the outside of the chamber to suppress the vaporized substance from adhering to the inner wall of the chamber as a solid (see, e.g., Japanese Patent Laid-Open Publication No. 2018-169050).

However, in the proposed technique described above, it is necessary to constantly heat the inner wall of the chamber during the production of the workpiece. That is, it is necessary to heat the inner wall of the chamber even when a process that does not require heating the workpiece is performed. This process corresponds to, for example, a process of loading/unloading the workpiece into/from a heat treatment device. Therefore, the amount of electric power required for production of the workpiece increases.

Further, when the chamber is heated, there is a concern that it may be difficult for an operator to approach the heat treatment device, or the elements and devices around the heat treatment device may be heated.

Therefore, there has been a demand for developing a heat treatment device capable of reducing the maintenance caused by the solid adhering to the inner wall of the chamber.

SUMMARY

An object to be solved by the present disclosure is to provide a heat treatment device capable of reducing the maintenance caused by a solid adhering to the inner wall of the chamber.

According to an embodiment of the present disclosure, a heat treatment device includes: a chamber capable of maintaining an atmosphere that is decompressed from an atmospheric pressure; an exhaust unit capable of exhausting an inside of the chamber through an exhaust port provided in the chamber; a support portion provided inside the chamber and capable of supporting a workpiece; a first heating unit provided inside the chamber and capable of heating the workpiece; an adhesion preventive plate detachably provided on an inner wall of the chamber; and a second heating unit capable of heating the adhesion preventive plate.

According to an embodiment of the present disclosure, there is provided a heat treatment device capable of reducing the maintenance caused by a solid adhering to the inner wall of the chamber.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF EMBODIMENTS

Figure 1:
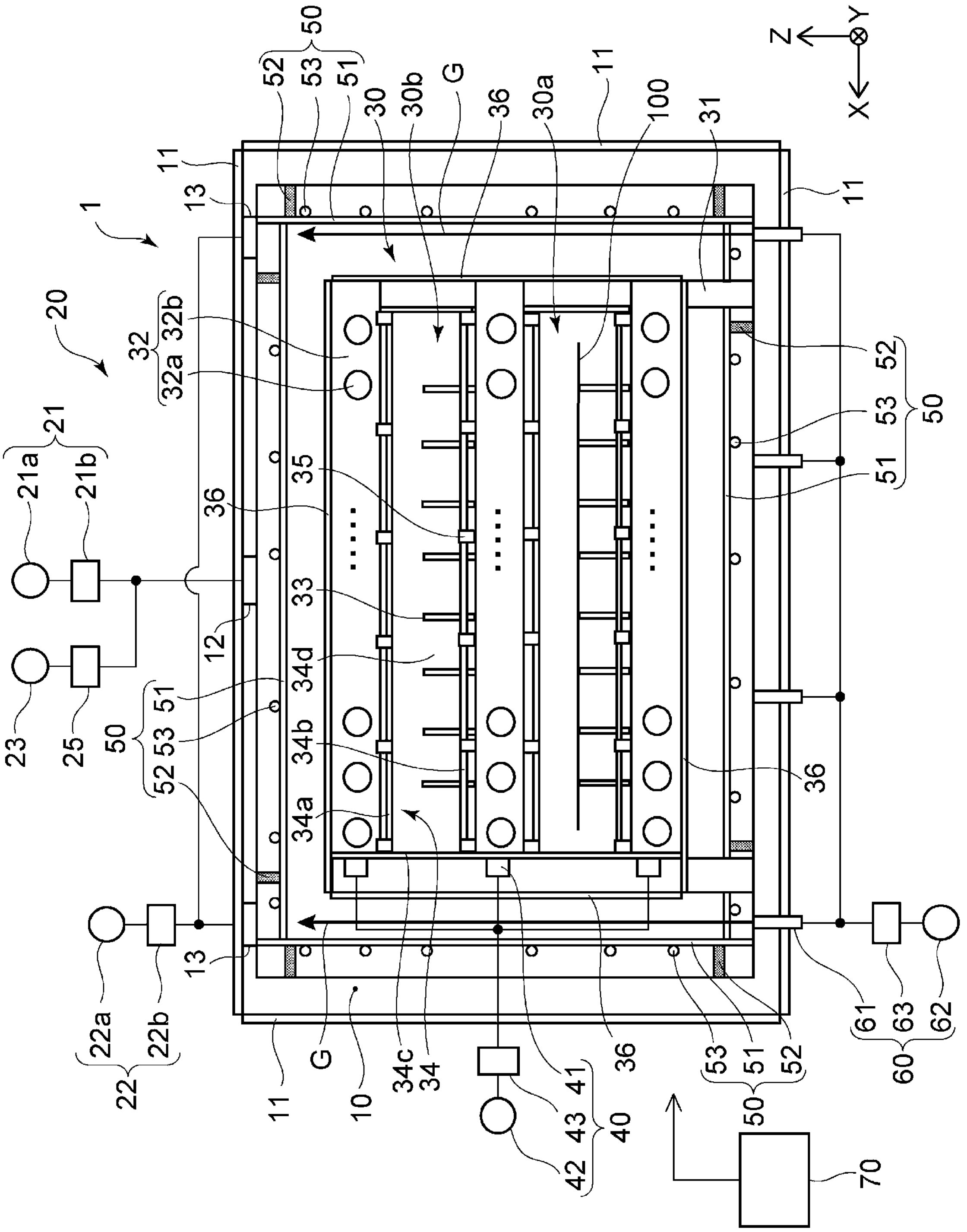
FIG. 1 is a schematic cross-sectional view illustrating a heat treatment device according to the present embodiment.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, embodiments will be described with reference to the accompanying drawings. In addition, in each drawing, the same components are designated by the same reference numerals and detailed descriptions thereof will be omitted as appropriate.

In the following, as an example, descriptions will be made on a heat treatment device that heats a workpiece (e.g., a substrate) in an atmosphere depressurized from the atmospheric pressure to form an organic film on the surface of the workpiece. However, the present disclosure is not limited thereto. For example, the present disclosure may be applied to a heat treatment device that heats a workpiece in an atmosphere depressurized from the atmospheric pressure to form an inorganic film on the surface of the workpiece. Alternatively, the present disclosure may be applied to a heat treatment device that heats a workpiece in an atmosphere depressurized from the atmospheric pressure to process the surface of the workpiece.

Further, the workpiece before heating may include, for example, a substrate and a solution provided on the upper surface of the substrate or may include only the substrate. In the following, as an example, descriptions will be made on a case where the workpiece before heating includes a substrate and a solution provided on the upper surface of the substrate and containing an organic material and a solvent. Further, the solution also includes those that have been calcined and are in a semi-cured state (a state where the semi-cured solution does not flow).

FIG. 1 is a schematic cross-sectional view illustrating a heat treatment device 1 according to the present embodiment.

Further, the X, Y, and Z directions in FIG. 1 represent three directions orthogonal to each other. The vertical direction in the present specification may be the Z direction.

The workpiece 100 before heating includes a substrate and a solution provided on the upper surface of the substrate.

The substrate may be, for example, a glass substrate or a semiconductor wafer. However, the substrate is not limited to the one illustrated, and may be any type.

The solution contains, for example, an organic material and a solvent. The organic material is not particularly limited as long as it may be dissolved by a solvent. The solution may be, for example, a varnish containing polyamic acid. However, the solution is not limited to the example described herein.

A substance that vaporizes when the workpiece 100 coated with a solution containing an organic material and a solvent is heated is referred to as a "vaporized substance." Further, the solid originated from the vaporized substance is called a "solid adhering to the inner wall of the chamber" or a "solid from vaporized substance."

As illustrated in FIG. 1, the heat treatment device 1 is provided with, for example, a chamber 10, an exhaust unit 20, a processing unit 30, a cooling unit 40, an adhesion protective unit 50, a re-vaporized substance discharge unit 60, and a controller 70.

The chamber 10 has an airtight structure capable of maintaining an atmosphere decompressed from the atmospheric pressure. The chamber 10 has a box shape. The external shape of the chamber 10 is not particularly limited. The external shape of the chamber 10 may be, for example, a rectangular parallelepiped. The chamber 10 may be made of a metal such as, for example, stainless steel.

One end of the chamber 10 is opened in the Y direction. The opening of the chamber 10 is provided, for example, to load and unload the workpiece 100. The opening of the chamber 10 may be opened and closed by an opening/closing door (not illustrated). The opening/closing door is pressed against the chamber 10 by a drive device (not illustrated). As a result, the opening/closing door closes the opening of the chamber 10 to be airtight. The drive device (not illustrated) separates the opening/closing door from the chamber 10. As a result, the workpiece 100 may be loaded or unloaded through the opening of the chamber 10.

The other end of the chamber 10 may also be opened in the Y direction. The opening at the other end of the chamber 10 may be opened and closed by a cover (not illustrated). The cover may be screwed to the other end of the chamber 10 via, for example, a sealing material such as an O-ring. When the other end of the chamber 10 is opened, a maintenance may be performed, for example, from the other end of the chamber 10.

A cooling unit 11 may be provided on the outer wall of the chamber 10. A cooling water supply unit (not illustrated) is connected to the cooling unit 11. The cooling unit 11 may be, for example, a water jacket. When the cooling unit 11 is provided, the temperature of the outer wall of the chamber 10 may be suppressed from becoming higher than a predetermined temperature.

The exhaust unit 20 exhausts the inside of the chamber 10. The exhaust unit 20 includes, for example, a first exhaust unit 21, a second exhaust unit 22, and a third exhaust unit 23.

The first exhaust unit 21 is connected to, for example, an exhaust port 12 provided on the ceiling surface of the chamber 10. The first exhaust unit 21 exhausts the inside of the chamber 10 through the exhaust port 12 provided in the chamber 10.

The first exhaust unit 21 includes, for example, an exhaust pump 21*a* and a pressure control unit 21*b*.

The exhaust pump 21*a* may perform a rough exhaust from the atmospheric pressure to a predetermined pressure. Therefore, the exhaust pump 21*a* has a larger displacement than an exhaust pump 22*a* (to be described later). The exhaust pump 21*a* may be, for example, a dry vacuum pump.

The pressure control unit 21*b* is provided between the exhaust port 12 and the exhaust pump 21*a*. The pressure control unit 21*b* controls the internal pressure of the chamber 10 to be a predetermined pressure based on the output of a vacuum gauge (not illustrated) that detects the internal pressure of the chamber 10. The pressure control unit 21*b* may be, for example, an auto pressure controller (APC).

The second exhaust unit 22 is connected to, for example, an exhaust port 13 provided on the ceiling surface of the chamber 10. The second exhaust unit 22 exhausts the inside of the chamber 10 through the exhaust port 13 provided in the chamber 10.

The second exhaust unit 22 includes, for example, an exhaust pump 22*a* and a pressure control unit 22*b*.

The exhaust pump 22*a* performs an exhaust to a lower predetermined pressure after the rough exhaust by the exhaust pump 21*a*. The exhaust pump 22*a* has, for example, an exhaust capacity capable of exhausting the inside of the chamber to a high vacuum molecular flow region. For example, the exhaust pump 22*a* may be a turbo molecular pump (TMP).

The pressure control unit 22*b* is provided between the exhaust port 13 and the exhaust pump 22*a*. The pressure control unit 22*b* controls the internal pressure of the chamber 10 to be a predetermined pressure based on the output of a vacuum gauge (not illustrated) that detects the internal pressure of the chamber 10. The pressure control unit 22*b* may be, for example, an APC.

The third exhaust unit 23 is connected between the exhaust port 12 and the pressure control unit 21*b* of the first exhaust unit 21. The third exhaust unit 23 is connected to the exhaust system of a factory. The third exhaust unit 23 may be, for example, a pipe made of stainless steel. In the third exhaust unit, a valve 25 is provided between the exhaust port 12 and the exhaust system of the factory. The third exhaust unit may have a blower such as a fan between the valve 25 and the exhaust system of the factory. When the third exhaust unit has a blower, the gas in the chamber 10 may be forcibly discharged.

In the above, descriptions have been made on the case where the exhaust port 12 and the exhaust port 13 are provided on the ceiling surface of the chamber 10, but the present disclosure is not limited thereto. The exhaust port 12 and the exhaust port 13 may be provided on, for example, the bottom surface of the chamber 10. When the exhaust port 12 and the exhaust port 13 are provided on the ceiling surface or the bottom surface of the chamber 10, an air flow toward the ceiling surface or the bottom surface of the chamber 10 may be formed inside the chamber 10. When such an air flow is formed, the vaporized substance containing the organic material may be easily carried on the air flow and discharged to the outside of the chamber 10. Therefore, the foreign substances caused by the vaporized substance may be suppressed from adhering to the workpiece 100.

The processing unit 30 includes, for example, a frame 31, a heating unit 32 (e.g., the first heating unit), a support portion 33, a soaking unit 34, a soaking plate support portion 35, and a cover 36.

A processing region 30*a* and a processing region 30*b* are provided inside the processing unit 30. The processing regions 30*a* and 30*b* are spaces for processing the workpiece 100. The workpiece 100 is supported by the support portion 33 inside the processing regions 30*a* and 30*b*. The processing region 30*b* is provided above the processing region 30*a*. Although the case where two processing regions are provided is illustrated, the present disclosure is not limited thereto. For example, only one processing region may be provided, or three or more processing regions may be provided. In the present embodiment, as an example, a case where two processing regions are provided inside the heat treatment device 1 will be illustrated. However, the case where one processing region and three or more processing regions are provided inside the heat treatment device 1 may also be similarly considered.

The processing regions 30*a* and 30*b* are provided between the heating unit 32 and the heating unit 32. The processing regions 30*a* and 30*b* are surrounded by a soaking unit 34 (an upper soaking plate 34*a*, a lower soaking plate 34*b*, a side soaking plate 34*c*, and a side soaking plate 34*d*).

As will be described later, the upper soaking plate 34*a* and the lower soaking plate 34*b* are formed by a plurality of plate-shaped members supported by a plurality of soaking plate support portions 35. Therefore, the space inside the processing region 30*a* and the chamber 10 is connected via gaps provided between the upper soaking plates 34*a* and gaps provided between the lower soaking plates 34*b*. Therefore, when the pressure in the space between the inner wall of the chamber 10 and the processing unit 30 is reduced, the pressure in the space inside the processing region 30*a* is also reduced. Since the processing region 30*b* has the same structure as the processing region 30*a*, the description thereof will be omitted.

When the pressure in the space between the inner wall of the chamber 10 and the processing unit 30 is reduced, the heat may be suppressed from being released from the processing regions 30*a* and 30*b* to the outside. That is, the heating efficiency and the heat storage efficiency may be improved. Therefore, the electric power applied to the heater 32*a*, which will be described later, may be reduced. Further, when the electric power applied to the heater 32*a* is reduced, the temperature of the heater 32*a* may be suppressed from becoming higher than a predetermined temperature. As a result, the life of the heater 32*a* may be extended.

Further, since the heat storage efficiency is improved, the temperatures of the processing regions 30*a* and 30*b* may be rapidly increased. Therefore, it is possible to cope with a process that requires a rapid temperature rise. In addition, the temperature of the outer wall of the chamber 10 may be suppressed from rising. Therefore, the cooling unit 11 may be simplified.

The frame 31 has a role of fixing the heating unit 32, the support portion 33, the soaking unit 34, the soaking plate support portion 35, and the cover 36 in the chamber 10. Further, the frame 31 has a role of forming the internal space of the chamber 10 into a double structure of the chamber 10 and the processing unit 30. The frame 31 has a skeleton structure made of an elongated plate material or shaped steel. The external shape of the frame 31 is not particularly limited. For example, the external shape of the frame 31 may be a rectangular parallelepiped. The frame 31 may be fixed to the chamber 10 via a heat insulating material. Also, the frame 31 may be made of a material having a good thermal conductivity. For example, the frame 31 may be made of a metal such as stainless steel.

A plurality of heating units 32 may be provided in the lower parts of the processing regions 30*a* and 30*b* and in the upper parts of the processing regions 30*a* and 30*b*. The heating units 32 provided in the lower parts of the processing regions 30*a* and 30*b* serve as lower heating units. The heating units 32 provided in the upper parts of the processing regions 30*a* and 30*b* serve as upper heating units. The lower heating units may face the upper heating units. When a plurality of processing regions is provided to overlap with each other in the vertical direction, the upper heating units provided in the lower processing region may also be used as the lower heating unit provided in the upper processing region.

The heating units 32 are provided inside the chamber 10 and heat the workpiece 100.

For example, the lower surface (back surface) of the workpiece 100 supported by the processing region 30*a* is heated by the heating unit 32 provided in the lower part of the processing region 30*a*. The upper surface (front surface) of the workpiece 100 supported by the processing region 30*a* is heated by the heating units 32 that are used in the processing region 30*a* as well as the processing region 30*b*.

The lower surface (back surface) of the workpiece 100 supported by the processing region 30*a* is heated by the heating units 32 that are used in the processing region 30*a* as well as the processing region 30*b*. The upper surface of the workpiece 100 supported by the processing region 30*b* is heated by the heating units 32 provided in the upper part of the processing region 30*b*.

In this way, the number of heating units 32 may be reduced. As a result, reduction of power consumption, reduction of manufacturing cost, and space saving may be achieved.

Each of the plurality of heating units 32 has at least one heater 32*a* and a pair of holders 32*b*. In the following, descriptions will be made on a case where a plurality of heaters 32*a* is provided.

The heater 32*a* has a rod shape and extends in the Y direction between the pair of holders 32*b*. The plurality of heaters 32*a* may be provided side by side in the X direction. The plurality of heaters 32*a* may be provided, for example, at equal intervals. The heater 32*a* may be, for example, a sheathed heater, a far-infrared heater, a far-infrared lamp, a ceramic heater, or a cartridge heater. In addition, various heaters may be covered with a quartz cover.

In the present specification, various heaters covered with a quartz cover are also referred to as "rod-shaped heaters." Further, the cross-sectional shape of the "rod-shaped" heater is not limited. The cross-sectional shape of the "rod-shaped" heater also includes, for example, a columnar shape or a prismatic shape.

Further, the heater 32*a* is not limited to the one illustrated. For example, the heater 32*a* may be anything as long as it heats the workpiece 100 in an atmosphere depressurized from the atmospheric pressure. That is, the heater 32*a* may be anything as long as it utilizes the thermal energy generated by radiation.

The specification, number, and interval of the plurality of heaters 32*a* in the heating unit 32 may be appropriately determined according to the composition of the solution to be heated (temperature at which the solution is heated) or the size of the workpiece 100. The specification, number, and interval of the plurality of heaters 32*a* may be appropriately determined by performing simulations and experiments.

Further, the space provided with the plurality of heaters 32*a* is surrounded by the holder 32*b*, the upper soaking plate 34*a*, the lower soaking plate 34*b*, the side soaking plate 34*c*, and the side soaking plate 34*d*. Gaps are provided between the upper soaking plates 34*a* and between the lower soaking plates 34*b*. However, the above gaps are relatively small Therefore, the space provided with the plurality of heaters 32*a* is substantially a closed space. Therefore, by supplying a cooling gas from the cooling unit 40 (to be described later) to the space provided with the plurality of heaters 32*a*, the plurality of heaters 32*a*, the upper soaking plate 34*a*, the lower soaking plate 34*b*, the side soaking plate 34*c*, and the side soaking plate 34*d* may be cooled.

When the vaporized substance contacts an object having a temperature lower than the temperature of the heated workpiece 100, the vaporized substance loses heat to the contacted object. Therefore, the vaporized substance is likely to be cooled and become a solid. However, the upper soaking plate 34*a* and the lower soaking plate 34*b* are heated by the heating units 32. Therefore, the vaporized substance may be suppressed from adhering to the upper soaking plate 34*a* and the lower soaking plate 34*b*. Further, as described above, an air flow toward the ceiling surface (or bottom surface) of the chamber 10 is formed inside the chamber 10. Therefore, the vaporized substance may be carried on this air flow to be discharged to the outside of the chamber 10.

Therefore, the vaporized substance may be suppressed from adhering to the workpiece 100. Further, in the heat treatment device 1 of the present embodiment, the workpiece 100 may be heated by the heating units 32 from both sides of the workpiece 100. Thus, it is possible to suppress a portion having a low temperature from being generated in the processing unit 30. Therefore, it is possible to further suppress the vaporized substance from adhering to the workpiece 100. Further, since the workpiece 100 is heated by the heating units 32 from both sides of the workpiece 100, the workpiece 100 may be readily heated.

The pair of holders 32*b* facing each other in the Y direction extend in the X direction (e.g., the longitudinal direction of the processing regions 30*a* and 30*b*). One holder 32*b* is fixed to the end of the frame 31 on the opening side. The other holder 32*b* is fixed to the end of the frame 31 opposite to the opening side. The pair of holders 32*b* may be fixed to the frame 31 by using, for example, a fastening member such as a screw. The pair of holders 32*b* hold a non-heating portion near the end of the heater 32*a*. The pair of holders 32*b* may be formed from, for example, an elongated metal plate or a shaped steel. The material of the pair of holders 32*b* is not particularly limited, but a material having a heat resistance and corrosion resistance may be used. The material of the pair of holders 32*b* may be, for example, stainless steel.

The support portion 33 is provided inside the chamber 10 and supports the workpiece 100. For example, the support portion 33 supports the workpiece 100 between the upper heating units and the lower heating units. A plurality of support portions 33 may be provided. The plurality of support portions 33 are provided in the lower part of the processing region 30*a* and the lower part of the processing region 30*b*. The plurality of support portions 33 may be rod-shaped.

One ends (upper ends) of the plurality of support portions 33 contact the lower surface (back surface) of the workpiece 100. Therefore, the shape of one ends of the plurality of support portions 33 may be hemispherical. When the shape of one ends of the plurality of support portions 33 is hemispherical, it is possible to suppress damage to the lower surface of the workpiece 100. Further, a contact area between the lower surface of the workpiece 100 and the plurality of support portions 33 may be reduced. Therefore, less heat may be transferred from the workpiece 100 to the plurality of support portions 33.

The workpiece 100 is heated by thermal energy due to radiation in an atmosphere depressurized from the atmospheric pressure. Therefore, a distance from the upper heating unit to the upper surface of the workpiece 100 and a distance from the lower heating unit to the lower surface of the workpiece 100 are distances at which the thermal energy due to radiation may reach the workpiece 100.

The other ends (lower ends) of the plurality of support portions 33 may be fixed to, for example, a plurality of rod-shaped members or plate-shaped members spanned between a pair of frames 31. In this case, the plurality of support portions 33 may be detachably provided on a rod-shaped member. In this way, work such as maintenance becomes easier.

The number, arrangement, and interval of the plurality of support portions 33 may be appropriately changed according to the size and rigidity (deflection) of the workpiece 100.

The material of the plurality of support portions 33 is not particularly limited, but a material having a heat resistance and corrosion resistance may be used. The material of the plurality of support portions 33 may be, for example, stainless steel.

The soaking unit 34 includes a plurality of upper soaking plates 34*a*, a plurality of lower soaking plates 34*b*, a plurality of side soaking plates 34*c*, and a plurality of side soaking plates 34*d*. The plurality of upper soaking plates 34*a*, the plurality of lower soaking plates 34*b*, the plurality of side soaking plates 34*c*, and the plurality of side soaking plates 34*d* have a plate shape.

The plurality of upper soaking plates 34*a* are provided on the lower heating unit side (e.g., workpiece 100 side) in the upper heating unit. The plurality of upper soaking plates 34*a* are provided apart from the plurality of heaters 32*a*. That is, a gap may be provided between the upper surfaces of the plurality of upper soaking plates 34*a* and the lower surfaces of the plurality of heaters 32*a*. The plurality of upper soaking plates 34*a* may be provided side by side in the X direction. A gap may be provided between the plurality of upper soaking plates 34*a*. When a gap is provided, it is possible to absorb the dimensional difference due to thermal expansion. Therefore, the upper soaking plates 34*a* may be suppressed from interfering with each other and suppressed from causing deformation. Further, as described above, the pressure in the space of the processing regions 30*a* and 30*b* may be reduced through the gap.

The plurality of lower soaking plates 34*b* are provided on the upper heating unit side (e.g., workpiece 100 side) in the lower heating unit. The plurality of lower soaking plates 34*b* are provided apart from the plurality of heaters 32*a*. That is, a gap may be provided between the lower surface of the plurality of lower soaking plates 34*b* and the upper surface of the plurality of heaters 32*a*. The plurality of lower soaking plates 34*a* may be provided side by side in the X direction. A gap may be provided between the plurality of lower soaking plates 34*b*. When a gap is provided, it is possible to absorb the dimensional difference due to thermal expansion. Therefore, the lower soaking plates 34*b* may be suppressed from interfering with each other and suppressed from causing deformation. Further, as described above, the pressure in the space of the processing regions 30*a* and 30*b* may be reduced through this gap.

The side soaking plate 34*c* is provided on each of the side portions of both the processing regions 30*a* and 30*b* in the X direction. The side soaking plate 34*c* may be provided inside the cover 36.

The side soaking plate 34*d* is provided on each of the side portions of both the processing regions 30*a* and 30*b* in the Y direction.

As described above, the plurality of heaters 32*a* have a rod shape and are provided side by side at predetermined intervals. When the heaters 32*a* have a rod shape, heat is radiated radially from the central axis of the heater 32*a*. In this case, as the distance between the central axis of the heater 32*a* and the heated portion becomes shorter, the temperature of the heated portion becomes higher. Therefore, when the workpiece 100 is held to face the plurality of heaters 32*a*, the region of the workpiece 100 located directly above or directly below the heater 32*a* has a higher temperature than the region of the workpiece 100 located directly above or directly below the space between the plurality of heaters 32*a*. That is, when the workpiece 100 is directly heated by using a plurality of rod-shaped heaters 32*a*, the temperature distribution varies in the plane of the heated workpiece 100.

When the temperature distribution varies within the plane of the workpiece 100, the quality of the formed organic film may deteriorate. For example, bubbles may be generated in the portion where the temperature is high, or the composition of the organic film may be changed in the portion where the temperature is high.

The heat treatment device 1 according to the present embodiment is provided with a plurality of upper soaking plates 34*a* and a plurality of lower soaking plates 34*b* as described above. Therefore, the heat radiated from the plurality of heaters 32*a* is incident on the plurality of upper soaking plates 34*a* and the plurality of lower soaking plates 34*b*. The heat incident on the plurality of upper soaking plates 34*a* and the plurality of lower soaking plates 34*b* is radiated toward the workpiece 100 while propagating in the plane direction inside the soaking plates 34*a*, 34*b*. Thus, it is possible to suppress the variation of the temperature distribution in the plane of the workpiece 100. As a result, the quality of the formed organic film may be improved.

The plurality of upper soaking plates 34*a* and the plurality of lower soaking plates 34*b* propagate the incident heat in the plane direction. Therefore, the materials of the soaking plates 34*a* and 34*b* may have high thermal conductivity. The plurality of upper soaking plates 34*a* and the plurality of lower soaking plates 34*b* may be, for example, aluminum, copper, or stainless steel. When a readily oxidizable material such as aluminum or copper is used, a layer containing a material that is difficult to oxidize may be provided on the surface.

A portion of the heat radiated from the plurality of upper soaking plates 34*a* and the plurality of lower soaking plates 34*b* is directed to the side of the processing region. Therefore, the side soaking plates 34*c* and 34*d* described above are provided on the side of the processing region. The heat incident on the side soaking plates 34*c* and 34*d* propagates in the surface direction inside the side soaking plates 34*c* and 34*d*. At this time, a portion of the heat input to the side soaking plates 34*c* and 34*d* is radiated toward the workpiece 100. Therefore, the heating efficiency of the workpiece 100 may be improved.

The materials of the side soaking plates 34*c* and 34*d* may be the same as the materials of the upper soaking plate 34*a* and the lower soaking plate 34*b* described above.

In the above, descriptions have been made on the case where a plurality of upper soaking plates 34*a* and a plurality of lower soaking plates 34*b* are provided side by side in the X direction, respectively. However, the upper soaking plate 34*a* and the lower soaking plate 34*b* are not limited thereto. For example, at least one of the upper soaking plate 34*a* and the lower soaking plate 34*b* may be a single plate-shaped member.

The plurality of soaking plate support portions 35 are provided side by side in the X direction. The soaking plate support portion 35 may be provided directly below the space between the upper soaking plates 34*a* in the X direction. The plurality of soaking plate support portions 35 may be fixed to the pair of holders 32*b* by using a fastening member such as a screw. The pair of soaking plate support portions 35 detachably support both ends of the upper soaking plate 34*a*. Further, the plurality of soaking plate support portions 35 that support the plurality of lower soaking plates 34*b* may also have the same configuration.

When the upper soaking plate 34*a* and the lower soaking plate 34*b* are supported by the pair of soaking plate support portions 35, the dimensional difference due to thermal expansion may be absorbed. Therefore, it is possible to suppress the deformation of the upper soaking plate 34*a* and the lower soaking plate 34*b*.

The cover 36 is formed of a plurality of plate-shaped members. The cover 36 covers the top surface, bottom surface, and side surface of the frame 31. That is, the inside of the frame 31 is covered by the cover 36. However, the cover 36 provided in the opening/closing door that opens/closes the opening of the chamber 10 may be fixed to, for example, the opening/closing door.

The cover 36 surrounds the processing regions 30*a* and 30*b*. However, there are gaps in the cover 36 near a boundary between the upper surface and the side surface of the frame 31, a boundary between the side surface and the bottom surface of the frame 31, and the opening/closing door. Specifically, a gap may be provided between the plate-shaped member provided on the upper surface of the frame 31 and the plate-shaped member provided on the side surface of the frame 31 of the cover 36. A gap may be provided between the plate-shaped member provided on the side surface of the frame 31 and the plate-shaped member provided on the bottom surface of the frame 31 of the cover 36. A gap may be provided between each of the plate-shaped members provided on the upper surface of the frame 31, the side surface of the frame 31, and the bottom surface of the frame 31 of the cover 36, and the plate-shaped member provided on the opening/closing door of the cover 36.

Further, the plate-shaped member of the cover 36 provided on the upper surface and the bottom surface of the frame 31 is divided into a plurality of parts. Further, a gap may be provided between the divided plate-shaped members. That is, the internal space of the processing unit 30 (e.g., the processing region 30*a* and the processing region 30*b*) communicates with the internal space of the chamber 10 through these gaps. Therefore, the pressure in the processing regions 30*a* and 30*b* may be made to be the same as the pressure in the space between the inner wall of the chamber 10 and the cover 36. The cover 36 may be made of stainless steel.

Further, at least one heater 32*a* may be provided between the side soaking plate 34*c* and the cover 36 to be separated from the side soaking plate 34*c* and the cover 36.

Further, when at least one heater 32*a* is provided on the outside of the side soaking plate 34*c*, the workpiece 100 may be heated via the side soaking plate 34*c*. Therefore, the heating efficiency of the workpiece 100 may be further improved. Further, when the heater 32*a* is provided on the outside of the side soaking plate 34*c*, the side soaking plate 34*c* and the cover 36 are heated by the heater 32*a* provided on the outside of the side soaking plate 34*c*. Thus, the vaporized substance may be suppressed from becoming a solid and adhering to the side soaking plate 34*c* and the cover 36. Therefore, maintenance due to the solid adhering to the inner wall of the chamber 10 may be reduced.

The cooling unit 40 supplies a cooling gas to a region where the heating unit 32 is provided. In this case, the cooling unit 40 cools the soaking unit 34 surrounding the processing regions 30*a* and 30*b* with the cooling gas. The cooled soaking unit 34 may indirectly cool the workpiece 100 in a high temperature state. Further, the cooling unit 40 may also supply a cooling gas to the workpiece 100 to directly cool the workpiece 100 in a high temperature state. The cooling unit 40 may also indirectly and directly cool the workpiece 100.

The cooling unit 40 includes a nozzle 41, a gas source 42, and a gas control unit 43.

When the workpiece 100 is indirectly cooled, as illustrated in FIG. 1, the nozzle 41 may be connected to a space where a plurality of heaters 32*a* is provided. The nozzle 41 may be attached to, for example, the side soaking plate 34*c* or the frame 31. In this case, for example, as illustrated in FIG. 1, the nozzle 41 may be provided on one side of the processing unit 30 in the X direction. Alternatively, nozzles 41 may be provided on both sides of the processing unit 30. The number and arrangement of the nozzles 41 may be changed as appropriate. For example, a plurality of nozzles 41 may be provided side by side.

When the workpiece 100 is directly cooled, the nozzle 41 may be provided in the processing regions 30*a* and 30*b*.

The gas source 42 supplies the cooling gas to the nozzle 41. The gas source 42 may be, for example, a high-pressure gas cylinder or factory piping. Further, a plurality of gas sources 42 may be provided.

The cooling gas may be a gas that does not easily react with the heated workpiece 100. The cooling gas may be, for example, nitrogen gas, carbon dioxide gas ($CO_2$), or noble gas. The noble gas is, for example, argon gas or helium gas. When the cooling gas is nitrogen gas, the running cost may be reduced. When heated, carbon dioxide is decomposed into carbon monoxide and oxygen, so that oxygen may react with the workpiece 100. However, when the temperature of the workpiece 100 is 100° C. or lower, the decomposition of carbon dioxide gas is suppressed. Therefore, when the temperature of the workpiece 100 is 100° C. or lower, carbon dioxide gas may be used as the cooling gas. Since the thermal conductivity of helium gas is relatively high, the cooling time may be shortened when helium gas is used as the cooling gas.

The temperature of the cooling gas may be, for example, room temperature (e.g., 25° C.) or lower.

The gas control unit 43 is provided between the nozzle 41 and the gas source 42. The gas control unit 43 may, for example, control the supply of the cooling gas and stop of the supply, and control at least one of the flow velocity and the flow rate of the cooling gas.

Further, the supply timing of the cooling gas may be set after the heat treatment for the workpiece 100 is completed. The heat treatment may be completed after the temperature at which the organic film is formed is maintained for a predetermined time.

For example, the supply timing of the cooling gas may be set immediately after the organic film is formed. Alternatively, the cooling gas may be supplied while the internal pressure of the chamber 10 is returned to the atmospheric pressure. Further, the cooling gas may be supplied after the internal pressure of the chamber 10 is returned to the atmospheric pressure. In this case, the cooling gas may be used as a vent gas for returning the internal pressure of the chamber 10 to the atmospheric pressure.

Immediately after the organic film is formed, the internal pressure of the chamber 10 is lower than the atmospheric pressure. That is, there is little gas inside the chamber 10. Therefore, when the cooling gas is gradually supplied to the inside of the processing regions 30*a* and 30*b*, the pressure in the processing regions 30*a* and 30*b* becomes higher than the pressure inside the chamber 10. A cooling gas G is gradually supplied to the inside of the processing regions 30*a* and 30*b* until the pressure in the chamber 10 becomes substantially the same as the atmospheric pressure. By doing so, the vaporized substance existing in the chamber 10 may be suppressed from becoming a solid, and a re-vaporized substance (to be described later) may be suppressed from being scattered inside the processing regions 30*a* and 30*b*. Then, when the pressure in the chamber 10 becomes substantially the same as the atmospheric pressure, the supply amount of the cooling gas G is increased. In this way, it is possible to cool the workpiece 100 rapidly and uniformly, while suppressing the vaporized substance existing in the chamber 10 from becoming a solid and the re-vaporized substance from being scattered inside the processing regions 30*a* and 30*b*.

Further, when the supply timing of the cooling gas is set immediately after the formation of the organic film or during the return of the internal pressure of the chamber 10 to the atmospheric pressure, the cooling time and the time for returning to the atmospheric pressure may be overlapped. That is, the cooling time may be substantially shortened.

Further, when the supply timing of the cooling gas is present during the return of the internal pressure of the chamber 10 to the atmospheric pressure or after the internal pressure of the chamber 10 is returned to the atmospheric pressure, there exists gas inside the chamber 10. Therefore, heat dissipation may be used by the convection.

The adhesion preventive unit 50 cools the vaporized substance to make the vaporized substance solid, and attaches the vaporized substance to the adhesion preventive unit 50 itself. By doing so, the adhesion preventive unit 50 plays a role of preventing the solid from vaporized substance from adhering to the inside of the chamber 10. Further, the adhesion preventive unit 50 also has a function of re-vaporizing the solid that has been generated from vaporized substance adhering to the adhesion preventive unit 50 in the chamber 10. The adhesion preventive unit 50 includes, for example, a plurality of adhesion preventive plates 51, a plurality of spacers 52, and a plurality of heaters 53 (corresponding to an example of a second heating unit).

The plurality of adhesion preventive plates 51 have a plate shape. The adhesion preventive plate 51 cools the vaporized substance to make the vaporized substance solid, and attaches the solid to the adhesion preventive plate 51 itself. By attaching the solid to the adhesion preventive plate 51, the adhesion preventive plate 51 has a role of preventing the solid generated from vaporized substance from adhering to the inside of the chamber 10. Therefore, a plurality of adhesion preventive plates 51 are provided between the inner wall of the chamber 10 and the processing unit 30 (cover 36). For example, the adhesion preventive plates 51 may be detachably attached to the inner walls on both sides of the chamber 10 in the X direction. Further, the adhesion preventive plates 51 may be detachably attached to the inner walls on both sides of the chamber 10 in the Y direction. Further, the adhesion preventive plate 51 may be detachably attached to the inner walls on both sides of the chamber 10 in the Z direction. The planar shape of the plurality of adhesion preventive plates 51 may be the same as the shape of the inner wall of the chamber 10 to which the adhesion preventive plates 51 are attached. The planar shape of the plurality of adhesion preventive plates 51 may be, for example, a quadrangle. The adhesion preventive plate 51 also has a role of transferring heat to the solid such that the solid is vaporized again. Therefore, the plurality of adhesion preventive plates 51 may be formed of, for example, a material having a high heat resistance, corrosion resistance, and thermal conductivity. The plurality of adhesion preventive plates 51 may be formed of, for example, stainless steel.

A substance that has been vaporized again from the solid by the adhesion preventive unit 50 is called a "re-vaporized substance."

The plurality of spacers 52 have a role of suppressing heat transfer between the adhesion preventive plate 51 and the chamber 10. Therefore, the plurality of spacers 52 are provided between the plurality of adhesion preventive plates 51 and the inner wall of the chamber 10. The plurality of spacers 52 have, for example, a columnar shape or a plate shape. The adhesion preventive plate 51 and the chamber 10 are separated by the height (thickness) of the spacer 52. Therefore, a space is formed between the adhesion preventive plate 51 and the inner wall of the chamber 10. When the workpiece 100 is heated, the pressure inside the chamber 10 is reduced. Therefore, the space formed between the adhesion preventive plate 51 and the inner wall of the chamber 10 becomes a decompressed space. Therefore, the transfer of heat between the adhesion preventive plate 51 and the chamber 10 is suppressed by the vacuum heat insulating effect. As will be described later, in the cooling step, the adhesion preventive plate 51 re-vaporizes the solid from vaporized substance. At this time, the adhesion preventive plate 51 is heated by the heater 53. Therefore, the heat transfer between the adhesion preventive plate 51 and the chamber 10 may be suppressed by the vacuum heat insulating effect. The plurality of spacers 52 have holes that penetrate in the axial direction. The plurality of spacers 52 may have, for example, a cylindrical shape or an annular shape. For example, the adhesion preventive unit 50 may be screwed to the inner wall of the chamber 10 via the spacer 52.

The plurality of spacers 52 may be formed of, for example, a material having a high heat resistance and corrosion resistance and low thermal conductivity. The plurality of spacers 52 may be formed of an inorganic material such as ceramics. Further, the screws for screwing the adhesion preventive unit 50 to the inner wall of the chamber 10 via the spacers 52 may also be formed of a material having a high heat resistance and corrosion resistance and low thermal conductivity.

The heater 53 heats the adhesion preventive plate 51. The heater 53 may be configured to be the same as, for example, the heater 32*a* described above. At least one heater 53 may be provided for one adhesion preventive plate 51. The heater 53 may be provided, for example, between the adhesion preventive plate 51 and the inner wall of the chamber 10. The heater 53 may be attached, for example, to a bracket (not illustrated) provided on at least one of the adhesion preventive plate 51 and the inner wall of the chamber 10. The heater 53 may be in contact with the adhesion preventive plate 51 or may be provided at a distance from the adhesion preventive plate 51. Further, in the case of the heat treatment device 1 of the present embodiment, the heater 53 may be separated from the inner wall of the chamber 10. In this way, the temperature of the wall surface of the chamber 10 may be suppressed from rising when the adhesion preventive plate 51 is heated by the heater 53. Further, the adhesion preventive plate 51 may be provided with a thermometer (not illustrated).

As described above, when the vaporized substance contacts an object having a temperature lower than the temperature of the heated workpiece 100, the vaporized substance is cooled and becomes a solid, which in turn adheres to the object. The temperature of the inner wall of the chamber 10 and the temperature of the adhesion preventive plate 51 are lower than the temperature of the heated workpiece 100. Therefore, the vaporized substance easily adheres to the inner wall of the chamber 10 and the adhesion preventive plate 51. However, the adhesion preventive plate 51 is provided between the processing unit 30 where the vaporized substance is generated and the inner wall of the chamber 10. Therefore, even when the vaporized substance becomes a solid, most of the substance adheres to the adhesion preventive plate 51, so that the amount of the solid adhering to the inner wall of the chamber 10 may be reduced.

The re-vaporized substance discharge unit 60 has a role of promoting the discharge of the re-vaporized substance to the outside of the chamber 10. Further, the re-vaporized substance discharge unit 60 also has a role of suppressing the re-vaporized substance from flowing into the inside of the processing unit 30. The re-vaporized substance discharge unit 60 supplies the gas G to the space between the processing unit 30 and the adhesion preventive plate 51 to form an air flow toward the exhaust ports 12 and 13. The re-vaporized substance discharge unit 60 includes, for example, a plurality of nozzles 61, a gas source 62, and a gas control unit 63.

The plurality of nozzles 61 supply the gas G between the adhesion preventive plate 51 and the processing unit 30 (the region where the workpiece 100 is supported). A plurality of nozzles 61 may be provided on the wall surface of the chamber 10 facing the wall surface where the exhaust ports 12 and 13 are provided. For example, as illustrated in FIG. 1, when the exhaust ports 12 and 13 are provided on the ceiling of the chamber 10, the plurality of nozzles 61 may be provided on the bottom of the chamber 10. When the exhaust ports 12 and 13 are provided at the bottom of the chamber 10, the plurality of nozzles 61 may be provided on the ceiling of the chamber 10.

When viewed from the Z direction, the plurality of nozzles 61 may be provided side by side along the peripheral edge of the processing unit 30. The number and interval of the plurality of nozzles 61 may be appropriately changed according to the size of the processing unit 30. The number and interval of the plurality of nozzles 61 may be obtained, for example, by conducting experiments or simulations in advance.

The gas source 62 supplies the gas G to the nozzle 61. The gas source 62 may be, for example, a high-pressure gas cylinder or factory piping. Further, a plurality of gas sources 62 may be provided.

The gas G may be a gas that does not easily react with the heated workpiece 100. The gas G may be, for example, nitrogen gas, carbon dioxide gas ($CO_2$), or noble gas. The noble gas is, for example, argon gas or helium gas. As described above, when the temperature of the workpiece 100 is 100° C. or lower, the decomposition of carbon dioxide gas is suppressed. Therefore, when the temperature of the workpiece 100 is 100° C. or lower, carbon dioxide gas may be used as the cooling gas.

In this case, the gas G may be the same as or different from the cooling gas described above. When the gas G is the same as the cooling gas, either the gas source 62 or the gas source 42 may be provided.

The temperature of the gas G may be, for example, room temperature (e.g., 25° C.) or higher. When the temperature of the gas G becomes too lower than the temperature of the re-vaporized substance, the re-vaporized substance may be cooled to become a solid in the cooling step (to be described later). Therefore, a heater for controlling the temperature of the gas G may be further provided.

The gas control unit 63 is provided between the plurality of nozzles 61 and the gas source 62. The gas control unit 63 may control, for example, the supply of the gas G and stop of the supply, and control at least one of the flow velocity and the flow rate of the gas G.

The controller 70 includes, for example, a calculation unit such as a central processing unit (CPU) and a storage unit such as a memory. The controller 70 may be, for example, a computer. The controller 70 controls the operation of each element provided in the heat treatment device 1 based on the control program stored in the storage unit.

For example, the controller 70 controls the amount of electric power supplied to the heater 32*a* based on the detection values of the thermometers (not illustrated) provided in the processing regions 30*a* and 30*b*. Further, the controller 70 controls the amount of electric power supplied to the heater 53 based on the detection value of a thermometer (not illustrated) provided on the adhesion preventive plate 51.

For example, the controller 70 controls the supply amount of the cooling gas supplied into the chamber 10 and the supply amount of the gas G supplied into the chamber 10 based on the output of a vacuum gauge (not illustrated) provided in the chamber 10 and in the processing regions 30*a* and 30*b*.

Next, the operation of the heat treatment device 1 will be illustrated.

Figure 2:
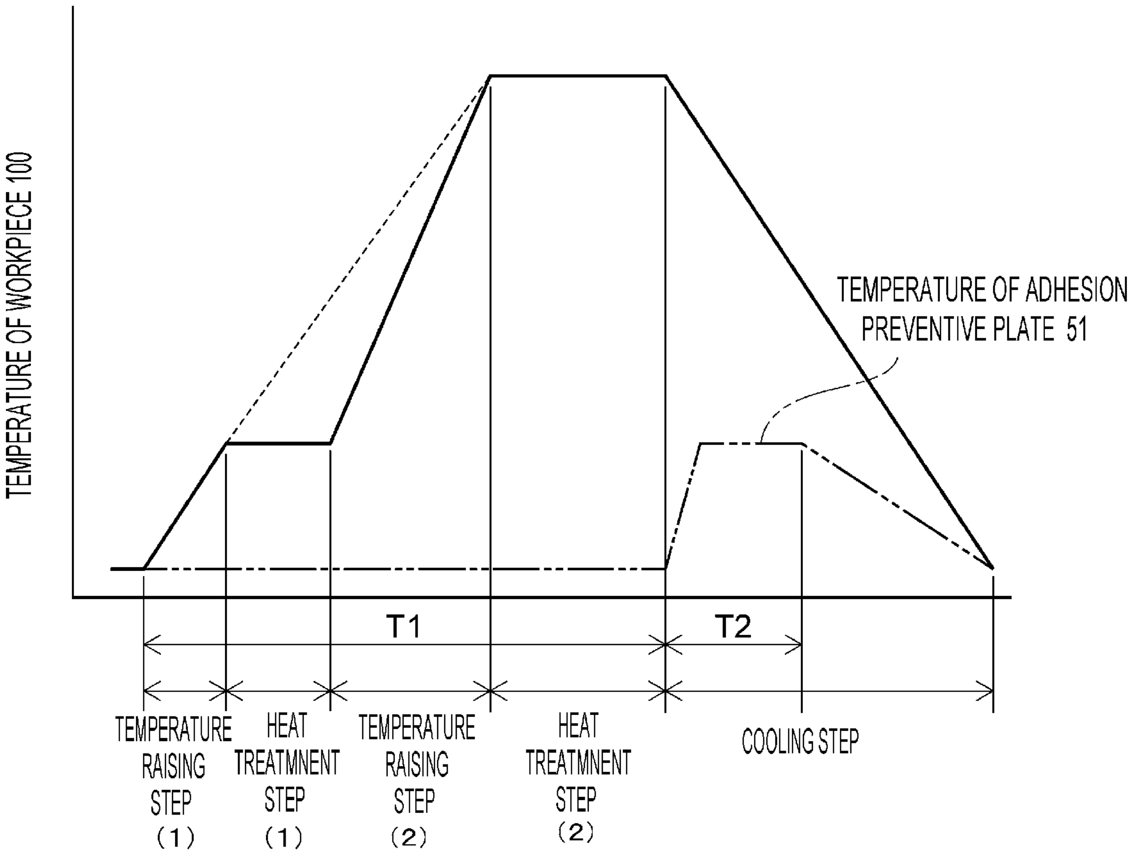
FIG. 2 is a graph illustrating a processing step of a workpiece.

FIG. 2 is a graph for illustrating the processing step of the workpiece 100.

As illustrated in FIG. 2, the organic film forming step includes a temperature raising step, a heat treatment step, and a cooling step.

First, an opening/closing door (not illustrated) is separated from one end of the chamber 10, and the workpiece 100 is loaded into the internal space of the chamber 10. When the workpiece 100 is loaded into the internal space of the chamber 10, the internal space of the chamber 10 is depressurized to a predetermined pressure by the exhaust unit 20.

When the internal space of the chamber 10 is depressurized to a predetermined pressure, electric power is applied to the heater 32*a*. Then, as illustrated in FIG. 2, the temperature of the workpiece 100 rises. The process in which the temperature of the workpiece 100 rises is called a temperature raising step. In the present embodiment, the temperature raising step is carried out twice (e.g., temperature raising steps (1) and (2)). The predetermined pressure may be a pressure at which polyamic acid in the solution does not react with oxygen remaining in the internal space of the chamber 10. That is, the predetermined pressure may be a pressure at which the polyamic acid in the solution is not oxidized. The predetermined pressure may be, for example, $1\times10^{-2}$ Pa to 100 Pa. That is, it may not be always necessary to perform exhaust by the second exhaust unit 22. When the exhaust by the first exhaust unit 21 is started and the pressure in the internal space of the chamber 10 becomes a pressure in the range of 10 Pa to 100 Pa, the heating unit 32 may start heating the workpiece 100.

The storage unit of the controller 70 stores in advance a predetermined temperature in the heat treatment step after the temperature raising step and the time of the temperature raising step. In addition, the calculation unit controls the temperature to reach a predetermined temperature within the time of the temperature raising step. Specifically, the controller 70 controls the amount of electric power supplied to the heater 32*a* in the temperature raising step (1) and the temperature raising step (2) based on the detection value of the thermometer (not illustrated).

After the temperature raising step, a heat treatment step is performed. The heat treatment step is a step of maintaining the predetermined temperature for a predetermined time. In the present embodiment, a heat treatment step (1) and a heat treatment step (2) may be provided.

The heat treatment step (1) may be, for example, a step of heating the workpiece 100 at a first temperature for a predetermined time to discharge water or gas contained in the solution. The first temperature may be, for example, 100° C. to 200° C. The predetermined time may be, for example, 15 minutes to 60 minutes. In the present embodiment, the heat treatment step (1) is maintained at 200° C. for 15 minutes.

The controller 70 monitors the temperature of the workpiece 100 with a thermometer (not illustrated), and controls the amount of electric power supplied to the heater 32*a* so that the workpiece 100 has the above-mentioned temperature. By carrying out the heat treatment step (1), it is possible to suppress the water and gas contained in the solution from being contained in the organic film which is a finished product.

The gas vaporized from the workpiece 100 in the heat treatment step (1) contains a substance that is cooled and becomes a solid, which in turn adheres to the inside of the chamber 10. After vaporized from the workpiece 100, the vaporized substance floats in the chamber 10 toward the exhaust port 12 or the exhaust port 13. The vaporized substance collides with the adhesion preventive plate 51 while floating in the chamber 10.

The adhesion preventive plate 51 is not heated by the heater 53 during the time T1 from the start of the temperature raising step (1) to the completion of the heat treatment step (2). Further, the heater 32*a* is used for heating from the start of the temperature raising step (1) to the completion of the heat treatment step (2). However, the inside of the chamber 10 is a decompressed space. Therefore, there is almost no heat transfer due to convection. Further, heat transfer by radiation is also blocked by the soaking plates 34*a* to 34*c* and the cover 36. Therefore, the heat of the heater 32*a* is hardly transferred to the adhesion preventive plate 51.

Therefore, the temperature of the adhesion preventive plate 51 is the same as a third temperature (to be described later) during the time T1 from the start of the temperature raising step (1) to the completion of the heat treatment step (2). The temperature of the adhesion preventive plate 51 is, for example, 50° C. to 120° C. The temperature of the adhesion preventive plate 51 is lower than the temperature of the vaporized substance. Therefore, when the vaporized substance collides with the adhesion preventive plate 51, the vaporized substance is cooled. As a result, the vaporized substance adheres to the adhesion preventive plate 51 as a solid.

Depending on the components of the solution, a plurality of first temperatures may be set and the heat treatment step (1) may be carried out a plurality of times. Alternatively, the heat treatment step (1) may be omitted. When the heat treatment step (1) is omitted, the process proceeds from the temperature raising step (1) to the heat treatment step (2). At this time, a substance vaporized during the temperature raising step (1) is generated. However, the adhesion preventive plate 51 is not heated. Therefore, the vaporized substance adheres to the adhesion preventive plate 51 as a solid.

The heat treatment step (2) is a step of maintaining the substrate (workpiece 100) coated with the solution at a predetermined pressure and temperature for a predetermined time to form an organic film. A second temperature may be the temperature at which imidization occurs. The second temperature may be, for example, 300° C. or higher. The predetermined time may be, for example, 15 minutes to 60 minutes. In the present embodiment, in order to obtain an organic film having a high degree of filling of molecular chains, the heat treatment step (2) is maintained at 500° C. for 15 minutes.

The controller 70 monitors the temperature of the workpiece 100 with a thermometer (not illustrated), and controls the amount of electric power supplied to the heater 32*a* so that the workpiece 100 has the above temperature.

The cooling step is a step of lowering the temperature of the workpiece 100 on which the organic film is formed. In the present embodiment, the cooling step is performed after the heat treatment step (2). The workpiece 100 is cooled to a temperature at which the workpiece 100 may be unloaded. For example, when the temperature of the workpiece 100 to be unloaded is room temperature, the workpiece 100 may be easily unloaded. However, in the heat treatment device 1, the workpiece 100 is continuously heat-treated. Therefore, when the temperature of the workpiece 100 is set to room temperature each time the workpiece 100 is unloaded, the time for raising the temperature of the next workpiece 100 becomes longer. That is, productivity may decrease. The temperature of the workpiece 100 to be unloaded may be, for example, 50° C. to 120° C. This unloading temperature is defined as a third temperature.

The controller 70 closes the pressure control unit 22*b* of the second exhaust unit 22. Then, the controller 70 controls the cooling unit 40 to supply the cooling gas into the region where the heating unit 32 is provided. In this way, the temperature of the workpiece 100 is indirectly and directly lowered. The controller 70 controls the cooling unit 40, and at the same time, controls the heater 53 of the adhesion preventive unit 50 and the re-vaporized substance discharge unit 60.

The controller 70 heats the adhesion preventive plate 51 by supplying electric power to the heater 53. Based on the detection value of a thermometer (not illustrated) provided on the adhesion preventive plate 51, the controller 70 heats the adhesion preventive plate 51 up to a temperature at which the solid from vaporized substance adhering to the adhesion preventive plate 51 is re-vaporized. Then, the temperature is maintained for the time T2. In the present embodiment, the adhesion preventive plate 51 is heated until the temperature of the adhesion preventive plate 51 reaches 200° C. The heating time (time T2) of the adhesion preventive plate 51 is 15 minutes to 30 minutes. In the present embodiment, the heating time (time T2) of the adhesion preventive plate 51 is set to 20 minutes. By doing so, the solid from vaporized substance adhering to the adhesion preventive plate 51 is desorbed from the adhesion preventive plate 51 as a gas.

The temperature at which the solid from vaporized substance becomes a gas varies depending on the type of the solid from vaporized substance (e.g., the type of organic material contained in the solution). Therefore, the temperature at which the adhesion preventive plate 51 is heated may be determined, for example, by conducting an experiment or a simulation in advance.

Further, the controller 70 controls the cooling unit 40 and at the same time controls the re-vaporized substance discharge unit 60 to supply the gas G into the chamber 10. The controller 70 compares the detected values of the vacuum gauge (not illustrated) in the chamber 10 and the vacuum gauge (not illustrated) in the processing unit 30. From the comparison result, the controller 70 controls the supply amount of the gas G so that the pressure in the processing unit 30 maintains a value higher than the pressure in the other regions in the chamber 10. The gas G forms an air flow toward the exhaust ports 12 and 13 in the space between the processing unit 30 and the adhesion preventive plate 51. The gas G may be heated to about 100° C. by a heater that controls the temperature of the gas G. By supplying the heated gas G into the chamber 10, it is possible to suppress hindering the heating of the adhesion preventive plate 51.

The substance re-vaporized from the adhesion preventive plate 51 is discharged from the exhaust port 12 together with the air flow generated by the gas G.

When the heating of the adhesion preventive plate 51 is completed, the controller 70 stops the supply of electric power to the heater 53 and the supply of the gas G into the chamber 10. Then, the controller 70 closes the first pressure control unit 21*b* and increases the supply amount of the cooling gas.

The controller 70 maintains the supply of the cooling gas until the detection value of the thermometer (not illustrated) provided in the processing regions 30*a* and 30*b* reaches the third temperature. When the detection value of the vacuum gauge (not illustrated) for detecting the pressure in the chamber 10 becomes the same pressure as the atmospheric pressure, the controller 70 opens the valve 25 of the third exhaust unit 23 and constantly exhausts the cooling gas.

When the detection value of the thermometer (not illustrated) provided in the processing regions 30*a* and 30*b* becomes the third temperature, the opening/closing door (not illustrated) is separated from one end of the chamber 10. Then, the heat-treated workpiece 100 is unloaded from one end of the chamber 10. After the workpiece 100 is unloaded, the next workpiece 100 is loaded into the chamber 10. Then, the above-mentioned organic film forming step is repeated.

When the workpiece 100 is loaded/unloaded, the temperature in the chamber 10 is maintained at the third temperature. The third temperature is lower than the temperature at which the solid from vaporized substance does not adhere to the inner wall of the chamber 10. Therefore, the amount of electric power required for production of the workpiece 100 may be reduced as compared with the case where the temperature inside the chamber 10 is set to a temperature at which the solid from vaporized substance does not adhere to the inner wall of the chamber 10.

Here, when the workpiece 100 is heated, the solution containing the organic material and the solvent is vaporized from the workpiece 100. The vaporized substance may adhere to the inner wall of the chamber 10, which has a temperature lower than that of the heated workpiece 100, as a solid. When the solid adhering to the inner wall of the chamber is peeled off from the inner wall of the chamber, the peeled-off solid may become particles and adhere to the surface of the workpiece.

Therefore, maintenance is required to remove the solid adhering to the inner wall of the chamber on a regular basis or as needed. During maintenance, the workpiece may not be heat-treated. Therefore, when the maintenance time becomes longer or the number of maintenances increases, the productivity is greatly reduced.

The heat treatment device 1 of the present embodiment includes an adhesion preventive plate detachably provided on the inner wall of the chamber and a heater 53 capable of heating the adhesion preventive plate 51. The adhesion preventive plate 51 is not heated during the period from the temperature raising step (1) to the heat treatment step (2), and the adhesion preventive plate 51 is heated in the cooling step.

In this way, the solid from vaporized substance generated between the temperature raising step (1) and the heat treatment step (2) adheres to the adhesion preventive plate 51. As a result, the solid from vaporized substance may be suppressed from adhering to the inner wall of the chamber 10.

Further, in the cooling step, by heating the adhesion preventive plate 51, it is possible to re-vaporize the solid from vaporized substance adhering to the adhesion preventive plate 51 from the adhesion preventive plate 51. Therefore, it is possible to reduce the number of maintenances caused by the solid adhering to the inner wall of the chamber 10.

Further, as described above, the adhesion preventive plate 51 is detachably attached to the inner wall of the chamber 10. Therefore, even when the vaporized substance becomes a solid and remains on the surface of the adhesion preventive plate 51, the adhesion preventive plate 51 to which the solid from vaporized substance adheres may be easily removed from the inner wall of the chamber 10. Then, a new adhesion preventive plate 51 or the adhesion preventive plate 51 from which the solid from vaporized substance has been removed is attached to the inner wall of the chamber 10. By doing so, the heat treatment of the workpiece 100 may be restarted.

That is, when the adhesion preventive plate 51 is detachably provided on the inner wall of the chamber 10, the time and number of maintenance due to the solid adhering to the inner wall of the chamber 10 may be reduced.

Further, as illustrated in FIG. 2, in the present embodiment, the adhesion preventive plate 51 is heated only during the time T2. Therefore, compared with the conventional heat treatment device in which the inner wall of the chamber is constantly heated during the production of the workpiece to suppress the vaporized substance from adhering to the inner wall of the chamber as a solid, the heat treatment device 1 of the present embodiment may reduce the amount of electric power required for production of the workpiece.

Further, in the cooling step, the heat treatment device 1 of the present embodiment supplies the cooling gas into the region provided with the heating unit 32 while heating the adhesion preventive plate 51, and depressurizes the inside of the chamber 10 by the first exhaust unit 21. In this way, a small amount of cooling gas is supplied around the workpiece 100. Thus, the pressure in the processing regions 30*a* and 30*b* is higher than those in the other regions in the chamber 10. Therefore, the re-vaporized substance from the adhesion preventive plate 51 may be suppressed from flowing into the processing unit 30.

Further, the heat treatment device 1 of the present embodiment includes a re-vaporized substance discharge unit 60. When the re-vaporized substance discharge unit 60 is provided, an air flow toward the exhaust ports 12 and 13 may be formed in the space between the processing unit 30 and the adhesion preventive plate 51. Therefore, the re-vaporized substance in the space between the processing unit 30 and the adhesion preventive plate 51 may be guided to the exhaust ports 12 and 13 by the air flow formed by the re-vaporized substance discharge unit 60. That is, the heater 53 promotes the discharge of the substance re-vaporized from the adhesion preventive plate 51 to the outside of the chamber 10 by the air flow of the gas G from the nozzle 61 toward the exhaust ports 12 and 13. Therefore, the substance re-vaporized from the adhesion preventive plate 51 may be suppressed from flowing into the processing unit 30. That is, an air curtain is formed between the adhesion preventive plate 51 and the processing unit 30 (the region where the workpiece 100 is supported) by the air flow formed by the re-vaporized substance discharge unit 60.

The embodiments have been described above. However, the present disclosure is not limited to such descriptions.

The scope of the present disclosure also includes those having appropriate design changes made by one skilled in the art for the above-mentioned embodiments as long as they have the features of the present disclosure.

For example, the shape, dimensions, and arrangement of the heat treatment device 1 are not limited to those described above, and may be appropriately changed.

Further, the elements included in each of the above-described embodiments may be combined with each other as much as possible, and the combination thereof is also included in the scope of the present disclosure as long as the features of the present disclosure are included.

For example, during the period from the temperature raising step (1) to the heat treatment step (2), the temperature of the adhesion preventive plate 51 provided on the inner wall (the ceiling surface and the bottom surface) of the chamber 10 in the Z direction may be set to a temperature equal to or higher than the temperature at which the substance vaporized from the workpiece 100 is vaporized. In this way, the adhesion preventive plate 51 provided on the inner wall of the chamber 10 in the Z direction does not take heat from the vaporized substance. Thus, the vaporized substance between the adhesion preventive plate 51 provided on the inner wall of the chamber 10 in the Z direction and the processing unit 30 is less likely to become a solid. Therefore, the vaporized substance may be discharged to the side surface of the chamber 10 in a gaseous state. That is, the solid from vaporized substance adheres more to the adhesion preventive plate 51 provided on the side surface of the chamber 10.

As described above, in the cooling step, an air flow is formed on the side surface of the chamber 10 by the re-vaporized substance discharge unit 60. Therefore, the substance re-vaporized from the adhesion preventive plate 51 provided on the side surface of the chamber 10 may be put on the air flow and discharged to the outside of the chamber 10.

Therefore, the discharge of the re-vaporized substance to the outside of the chamber 10 is promoted while further suppressing the re-vaporized substance from flowing into the processing unit 30. Further, the amount of the solid from vaporized substance that adheres to the adhesion preventive plate 51 provided on the inner wall of the chamber 10 in the Z direction may be significantly reduced. Thus, the number of replacements of the above-mentioned adhesion preventive plate 51 may be significantly reduced. Therefore, it is possible to further reduce the maintenance caused by the solid adhering to the inner wall of the chamber 10.

For example, a cooling unit for cooling the adhesion preventive plate 51 may be provided on the adhesion preventive plate 51. By doing so, even when the adhesion preventive plate 51 is heated to a temperature higher than the temperature at which the solution containing the organic material and the solvent is vaporized from the workpiece 100 by the heat energy generated by the radiation from the processing unit 30 in the heat treatment step (2), the adhesion preventive plate 51 may be cooled until the temperature of the adhesion preventive plate 51 becomes equal to or lower than the temperature at which the solution containing the organic material and the solvent is vaporized. Therefore, it is possible to make it easier for the solid from vaporized substance to adhere more easily to the adhesion preventive plate 51 in the heat treatment step (2).

For example, a plurality of gas sources 62 and a gas control unit 63 may be provided for the nozzle 61. By doing so, the type and temperature of the gas G may be appropriately changed.

For example, in the present embodiment, the controller 70 stops supplying the gas G into the chamber 10 after the heating of the adhesion preventive plate 51 is completed. However, as described above, by providing the plurality of gas sources 62 and the gas control unit 63, the gas G at room temperature may be supplied into the chamber 10. By doing so, it becomes possible to cool the inside of the chamber 10 in cooperation with the cooling gas. Therefore, the time of the cooling step may be shortened.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A heat treatment device comprising:

a chamber configured to maintain an atmosphere that is decompressed from an atmospheric pressure;

an exhaust configured to exhaust an inside of the chamber through an exhaust port provided in the chamber;

a support provided inside the chamber and configured to support a workpiece;

a first heater provided inside the chamber and configured to heat the workpiece;

an adhesion preventive plate detachably provided on an inner wall of the chamber;

a second heater configured to heat the adhesion preventive plate;

a nozzle configured to supply a gas between the adhesion preventive plate and a region where the workpiece is supported; and a soaker configured to surround the region where the workpiece is supported, wherein the exhaust port is provided on a ceiling surface or a bottom surface of the chamber, the nozzle is provided on a surface of the chamber facing a surface on which the exhaust port is provided, and an amount of the gas supplied from the nozzle is controlled inside the chamber so that a pressure in the region surrounded by the soaker is maintained at a pressure higher than a pressure of other regions inside the chamber.

2. The heat treatment device according to claim 1, further comprising: a plurality of spacers configured to separate the inner wall of the chamber from the adhesion preventive plate and form a space between the inner wall of the chamber and the adhesion preventive plate.

3. The heat treatment device according to claim 1, further comprising: a cooler configured to supply a cooling gas to a region provided with the first heater, wherein the second heater heats the adhesion preventive plate when the cooler supplies the cooling gas to the region provided with the first heater.

4. The heat treatment device according to claim 3, wherein the second heater stops heating of the adhesion preventive plate while the first heater heats the workpiece.

5. The heat treatment device according to claim 1, wherein an air curtain is formed between the adhesion preventive plate and the region where the workpiece is supported by an air flow of the gas from the nozzle to the exhaust port.

6. The heat treatment device according to claim 1, wherein the gas is supplied from the nozzle while the adhesion preventive plate is being heated by the second heater.

7. The heat treatment device according to claim 1, wherein the workpiece includes a substrate and a solution provided on an upper surface of the substrate, the solution containing an organic material and a solvent.

8. A heat treatment method comprising:

providing a heat treatment device including a chamber, an exhaust, a support, a heater, an adhesion preventive plate and a soaker;

disposing a workpiece on the support in a region surrounded by the soaker and depressurizing the chamber to a predetermined pressure;

increasing a temperature of the workpiece disposed on the support using the heater thereby performing a heat treatment on the workpiece while maintaining a temperature of the adhesion preventive plate to a first predetermined temperature such that a vaporized substance generated during the performing the heat treatment adheres to the adhesion preventive plate to become a solid;

cooling the workpiece by supplying a cooling gas between the region surrounded by the soaker and the adhesion preventive plate while maintaining the temperature of the adhesion preventive plate to a second predetermined temperature using the heater such that the solid adhering to the adhesion preventive plate is re-vaporized, wherein an amount of the gas supplied from the nozzle is controlled inside the chamber so that a pressure in the region surrounded by the soaker is maintained at a pressure higher than a pressure of other regions inside the chamber.

9. The heat treatment method according to claim 8, wherein the first predetermined temperature is between 50° C. and 120° C., and the second predetermined temperature is about 200° C.

10. The heat treatment method according to claim 8, wherein the adhesion preventive plate is detachably provided on an inner wall of the chamber.

* * * * *